United States Patent
Kato

(10) Patent No.: US 8,526,026 B2
(45) Date of Patent: Sep. 3, 2013

(54) DOCUMENT PROCESSING APPARATUS, DOCUMENT PROCESSING METHOD, AND PROGRAM FOR PREVENTING THE PRINTING OF MULTIPLE UNAUTHORIZED COPIES

(75) Inventor: Yutaka Kato, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 879 days.

(21) Appl. No.: 12/702,070

(22) Filed: Feb. 8, 2010

(65) Prior Publication Data

US 2010/0202020 A1    Aug. 12, 2010

(30) Foreign Application Priority Data

Feb. 10, 2009    (JP) .................. 2009-029108

(51) Int. Cl.
 *G06F 15/00* (2006.01)
(52) U.S. Cl.
 USPC .......... 358/1.14; 358/3.28; 382/284; 707/694
(58) Field of Classification Search
 USPC ............... 358/1.14, 3.28; 382/284; 707/694
 See application file for complete search history.

(56) References Cited

U.S. PATENT DOCUMENTS

2005/0289462 A1 * 12/2005 Kuroshima .............. 715/530
2006/0277219 A1 * 12/2006 Sato ........................ 707/200
2007/0206866 A1 *  9/2007 Nakai et al. ............. 382/232

FOREIGN PATENT DOCUMENTS

| JP | 2003-186642 A | 7/2003 |
| JP | 2006-338107 A | 12/2006 |

OTHER PUBLICATIONS

Japanese Office Action dated Jan. 4, 2013 for counterpart Japanese Patent Application No. 2009-029108.

* cited by examiner

*Primary Examiner* — Peter K Huntsinger
(74) *Attorney, Agent, or Firm* — Carter, DeLuca, Farrell & Schmidt LLP

(57) ABSTRACT

In a document processing system, a client PC transmits a request to generate a document for which multiple printing is to be prevented to a document generating server. The document generating server receives this request, and determines whether this request is one for generating the document for which multiple printing is to be prevented. Depending on the result of this determination, the document generating server appends a display for unauthorized printing to the document, and appends a button for printing operation in order to carry out printing of the document.

9 Claims, 14 Drawing Sheets

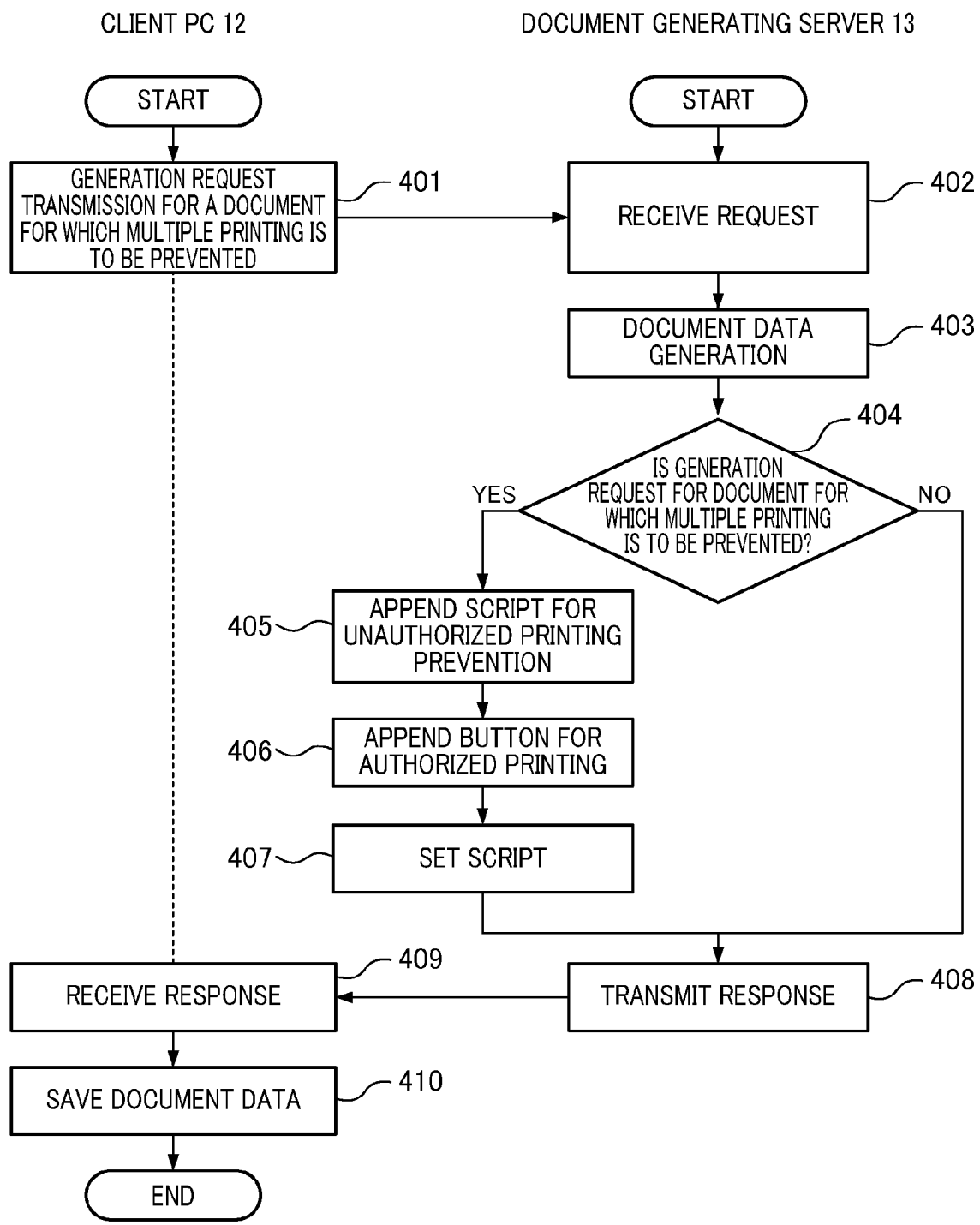

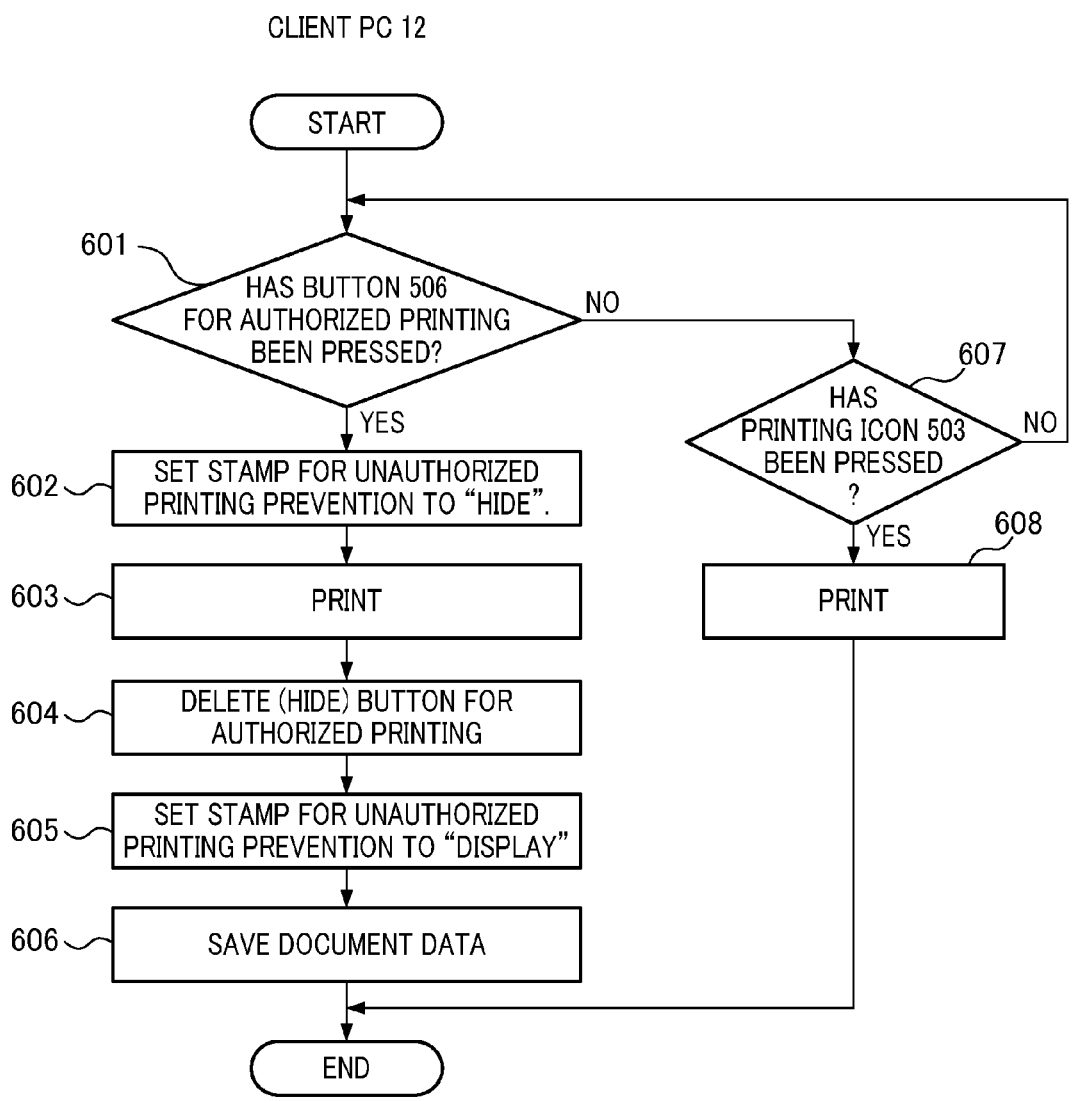

FIG. 5

```
//SET STAMP FOR UNAUTHORIZED PRINTING PREVENTION TO "HIDE"
aStump=this.getAnnots({nPage:0});
aStump[0].hidden=true
```
701

```
//PRINT
this.print({bUI: false, bSilent: true});
```
702

```
//SET BUTTON TO HIDE
fButton1=this.getField("Button1");
fButton1.display=display.hidden;
```
703

```
//SET STAMP FOR UNAUTHORIZED PRINTING PREVENTION TO "DISPLAY"
aStump[0].hidden=false
```
704

```
//SAVE DOCUMENT
app.execMenuItem("Save");
```
705

901

DOCUMENT PROCESSING APPARATUS, DOCUMENT PROCESSING METHOD, AND PROGRAM FOR PREVENTING THE PRINTING OF MULTIPLE UNAUTHORIZED COPIES

BACKGROUND OF THE INVENTION

1. Field of the Invention

The present invention relates to a technology that embeds a function that prevents multiple printing in a document file.

2. Description of the Related Art

Conventionally, a printing system is known in which a client machine (below, referred to simply as a "client"), a device that includes a printing function, and a server are connected by a network. Specifically, a system exists in which a document file such as a business form is generated by a server according to a request from a client, the generated document file is distributed to and saved by the client, and then sent from the client to a device such as a copier and printed.

A representative example is a certification issuing system for insurance agencies. In this system, certification files are issued by a server at a company headquarters according to requests from agencies, and distributed to the agents. At each of the agents, the issued certification files are received and saved. Then the certification is printed by a printer at the agency, and handed to customers who visit the agencies.

Frequently, the OS (operating system) that provides the environment for handling documents, as well as applications and print formats and the like, differ at each agency. Thus, in a system such as the one described above, frequently standard formats are used that can obtain the same display and printing results independently of differences in the environment. PDF (Portable Document Format) is an example of a standard format. PDF can be used in any environment provided that a display application, which is free of charge, has been installed on an information processing apparatus, and thus, PDF is a widely distributed document format. In recent years, the diffusion of PDF as a format for archiving electronic documents has also been progressing.

In such a system, because a PDF file that has been generated by a server is stored at a client, the stored PDF file can be printed any number of times. Thus, in a system that issues certificates and the like, there is a situation in that multiple printing of such stored documents cannot be prevented.

In order to resolve this situation, conventionally, a printing execution count and a printing allowed count are managed in association with the document, and control in which printing can only be carried out one time is carried out (refer, for example, to Japanese Patent Laid-Open No. 2003-186642). Specifically, when a certain document is printed, a printing execution count is calculated and updated, and whether the printing execution count exceeds the printing allowed count is checked. In addition, in the case in which the printing executed count exceeds the printing allowed count, control is carried out so that printing is not permitted.

However, in the conventional technology described above, because the system becomes complicated, the system tends to become complicated to maintain and manage. As a result, there is a situation in that the operating cost of the system greatly increases. Specifically, in a conventional method of resolving this situation, because the printing execution count and the printing allowed count are managed in association with a document, an arrangement such as a database is used. Thus, maintenance and management of a database is to be carried out.

In addition, processing such as updating the printing execution count and the restricting of printing cannot be realized by a PDF display application that is distributed free of charge. Thus, some sort of independent application is to be separately installed at the client. Therefore, there are situations in that the distribution, updating, version management and the like of the independent application is time consuming and the operating costs increase. In addition, in an environment in which an independent application cannot be distributed, there is a situation in that the multiple printing of certifications and the like cannot be prevented.

SUMMARY OF THE INVENTION

An apparatus according to one aspect of the present invention includes an authorized printing unit that, in a case in which a button for authorized printing has been pressed, an image for unauthorized printing of a document is set to hide, the document is printed without including the image for unauthorized printing, the button for authorized printing of the document is deleted, the image for unauthorized printing of the document is set to display, and the document is stored; and a normal printing unit that prints the document that includes the image for unauthorized printing.

Further features of the present invention will become apparent from the following description of exemplary embodiments (with reference to the attached drawings).

BRIEF DESCRIPTION OF THE DRAWINGS

FIG. 2 is a flowchart illustrating the flow of the processing according to a first embodiment.

FIG. 4 is a flowchart illustrating the flow of processing at a client PC according to the first embodiment.

FIG. 5 is a drawing that shows an example of a script that is set in a document.

DESCRIPTION OF THE EMBODIMENTS

Figure 1A:
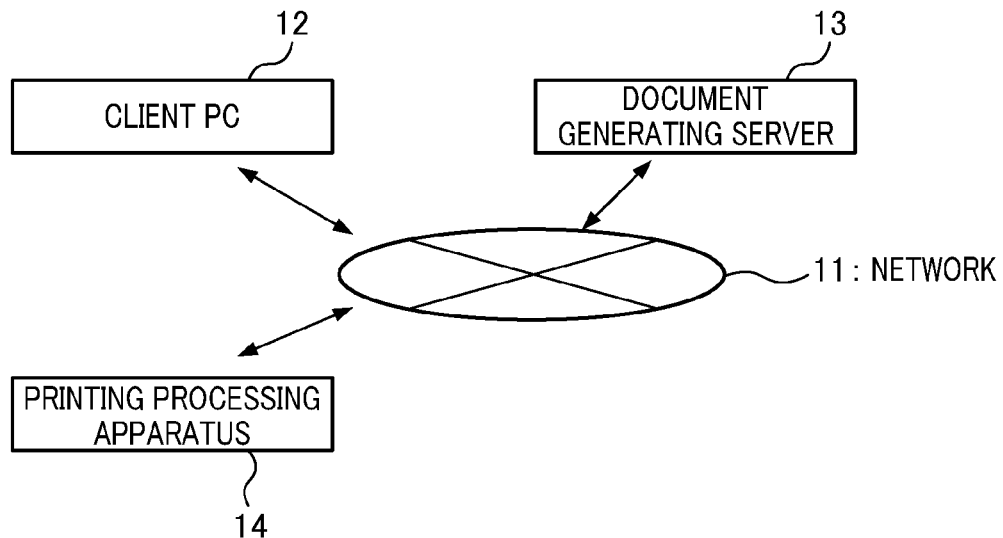
FIG. 1A is a block drawing that shows an example of a configuration of a system according to an embodiment of the present invention.

FIG. 1A is a block diagram that shows an example of the configuration of hardware according to an embodiment of the present invention. In the document processing system shown in this example, a PC (personal computer) 12, which is a client, a document generating server 13, and a printing processing apparatus 14 are connected by a network 11, and can communicate with each other. Note that a PC serving as a client machine is referred to as a "client PC".

Figure 13:
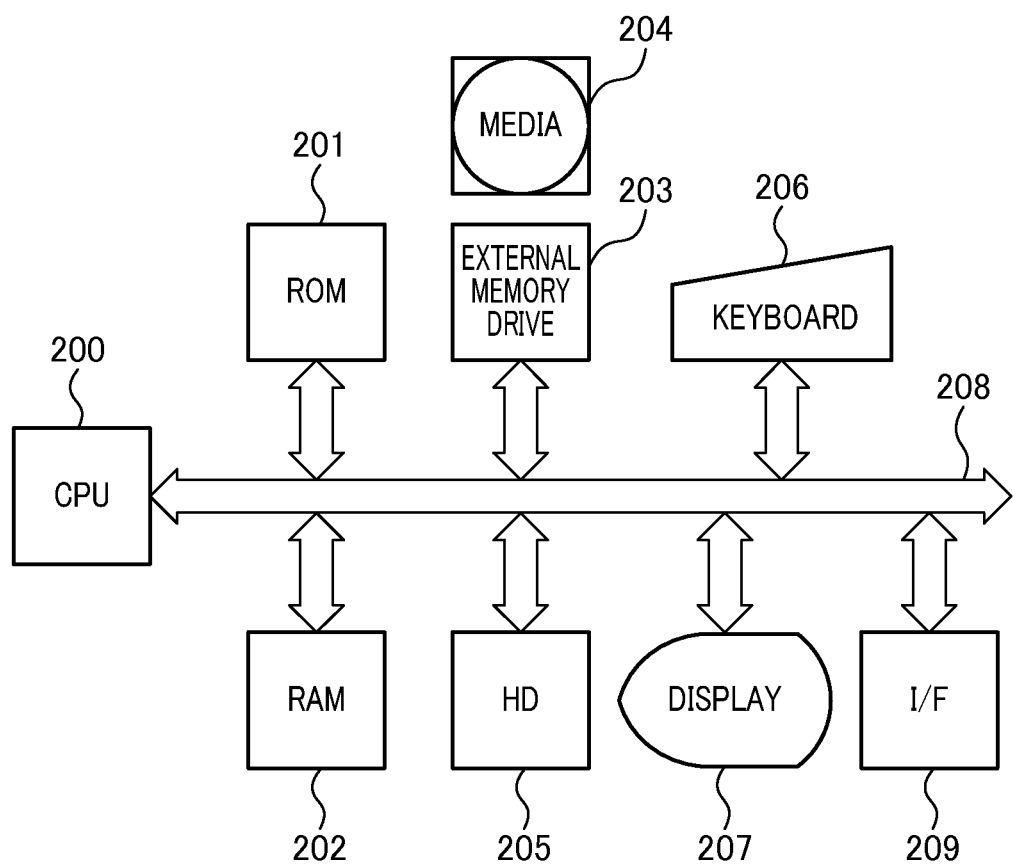
FIG. 13 is a block diagram that illustrates a schematic structure of a client PC and a document generating server.

An information processing apparatus that is used by the client PC 12 and the document generating server 13 has a configuration that is shown, for example, in FIG. 13. Specifically, a CPU (central processing unit), which is a control center, and a memory device that includes a ROM (read only memory) 201 and RAM (random access memory) 202 are provided. In addition, accessing of a storage medium 204 is carried out by using an external memory drive 203. The program used in the present embodiment is stored on nonvolatile memory, such as an HD (hard disc) 205. In addition, this program is loaded to the RAM 202, and interpreted and executed by the CPU 200. A keyboard 206 is provided as an operation input device, and a display is provided as a display device 207. In addition, communication processing through the network with external apparatuses is carried out via an interface 209. Note that these structural elements are communicably connected via a bus 208.

The printing processing apparatus 14 may use any arbitrary device that has a printing function such as a copier. Examples include a single function peripheral (SET) that includes only a printing function, or a multi-function peripheral (MFP) that includes, other than a printing function, scanning, copying, and facsimile functions and the like.

Figure 1B:
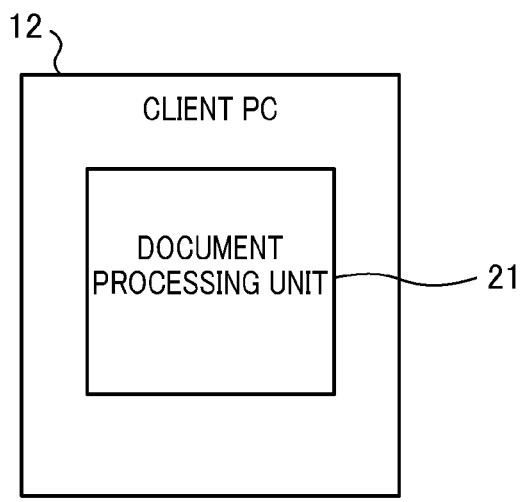
FIG. 1B is a block drawing that shows an example of a configuration of a system according to an embodiment of the present invention.

FIG. 1B conceptually shows a drawing of a configuration diagram of a client PC 12.

A document processing unit 21 is present in the client PC 12, and, for example, the document processing unit 21 issues a request to generate a document, for which multiple printing is to be prevented, to the document generating server 13. In addition, the document processing unit 21 receives and then processes the document file from the document generating sever 13. This document processing unit 21 is realized by using an application that carries out the processing of documents.

Figure 1C:
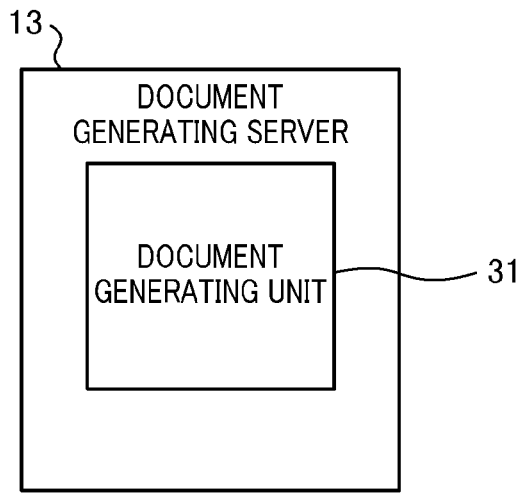
FIG. 1C is a block drawing that shows an example of a configuration of a system according to an embodiment of the present invention.

FIG. 1C conceptually shows an example of a configuration of a document generating server 13.

A document generating unit 31 is present in the document generating server 13, generates a document file that corresponds to the request from the client PC 12, and returns this to the client 12. This document generating unit 31 is realized by using an application that carries out the generation of documents.

FIG. 2 is a flowchart that illustrates the flow of processing according to a first embodiment of the present invention. Note that the programs used in the present embodiment are each stored on a client PC 12 and the HD (hard drive) 205 of the document generating server 13, loaded to the RAM 202 of each apparatus, and executed by a CPU 200.

FIG. 2 shows a flow from the issuing of a generation request for a document by the client PC 12 to the document generating server 13, to the point that the document file generated by the document generating server 13 is stored in the client PC 12. Note that the client PC 12 carries out the processing showed in steps 401, 409, and 410, and the document generating server 13 carries out the processes that are shown in step 402 through 408.

In step 401, the client PC 12 transmits to the document generating server 13 a generation request for a document for which multiple printing is to be prevented. This request is a request for generating a document for which multiple printing is to be prevented. This step is carried out in the case in which the issuance of a certificate or the like for which multiple printing is to be prevented has been requested. One example of a specific request method is the method that includes the document name in an HTTP request URI. For example, a document name, such as: http://www.hoge.co.jp/req?form=Shoumeisyo can be transmitted to the document generation server 13.

In step 402, the document generating server 13 receives a generation request from the client server PC 12 for a document file for which multiple printing is to be prevented.

In step 403, the document generation server 13 generates document data. This step is executed irrespective of whether the document is one for which multiple printing is to be prevented.

In step 404, the document generating server 13 determines whether the request received in step 402 includes the generation of a document file for which multiple printing is to be prevented. A specific example is one in which the document generating server 13 first analyses the HTTP request URI and determines the requested document name. Next, the document generating server 13 refers to the content of the set file for which document attributes managed on the server side have been set. In addition, the document generating server 13 confirms whether multiple printing is to be prevented for the requested document. In this set file, information about whether multiple printing is to be prevented for the document name and document in a compatible form is disclosed.

In step 404, in the case in which the document generating server 13 has determined that the received request includes the normal generation of a document, the processing proceeds to step 408. In addition, in the case in which it has been determined that the received request includes the generation of a document for which multiple printing is to be prevented, the document generating serve 13 carries out the processing that is shown in steps 405 through 407.

In step 405, the document generating server 13 adds a stamp (image) for unauthorized printing prevention to the document that has been generated in step 403. The unauthorized printing prevention stamp will be described below using FIG. 3.

In step 406, the document generating server 13 adds a stamp for authorized printing to the document that has been generated in step 403. The button for authorized printing will be explained below using FIG. 3.

In step 407, the document generating server 13 sets a script for carrying out the processing that is described below in FIG. 4 in the document that has been generated in step 403. Here, the details of the script that is set will be explained using FIG. 5.

In step 408, the document generating server 13 returns the generated document to the client PC 12.

In step 409, the client PC 12 receives the document that has been returned from the document generating server 13 in step 408. Then, the processing proceeds to step 410, and the client PC 12 saves the document that has been received in step 409 in the client PC 12. Note that the processing from 402 to 408 in this flowchart can also be executed by the client PC 12.

Figure 3:
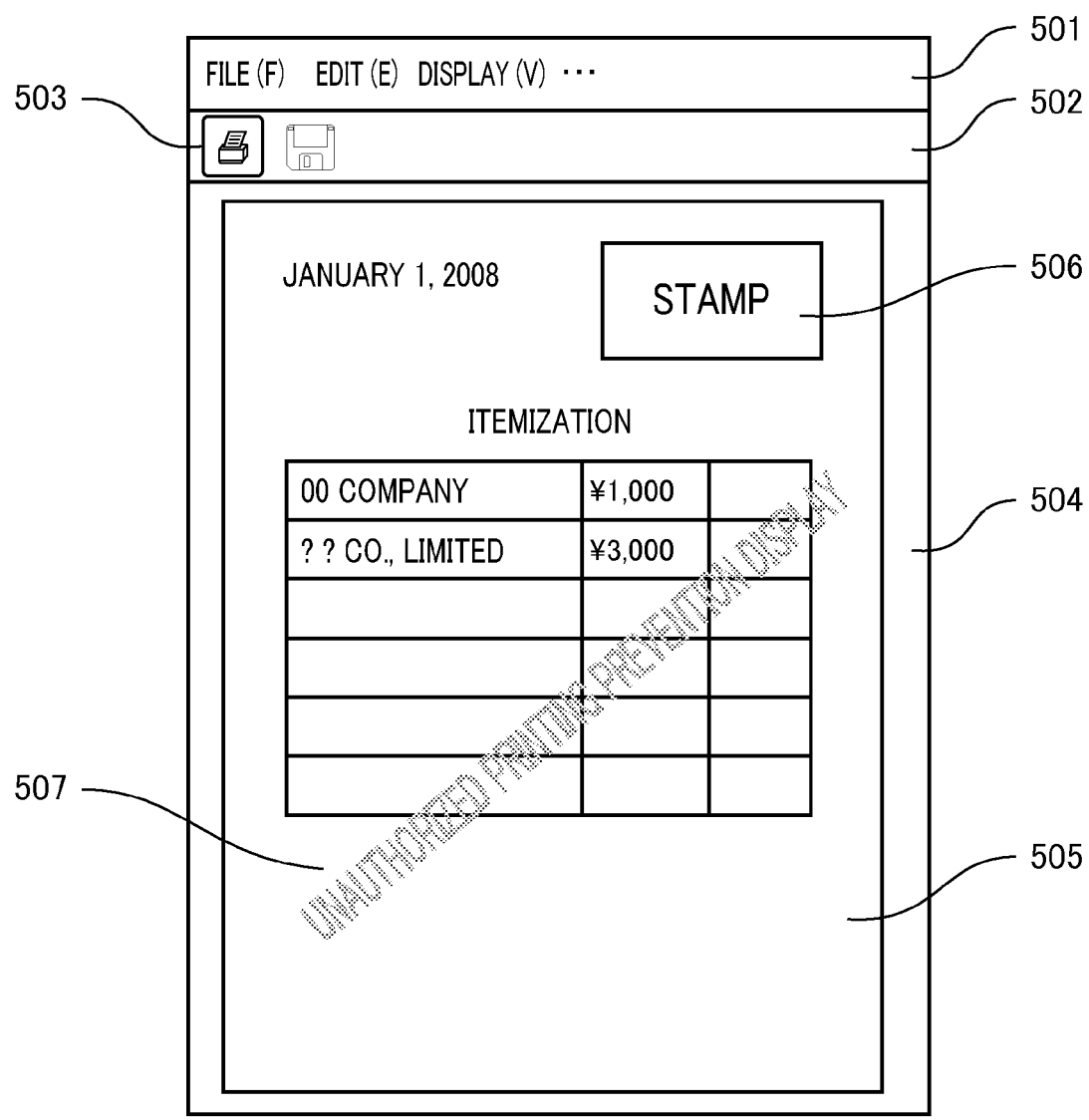
FIG. 3 is a conceptual drawing that shows a display example of a document according to the document processing unit.

FIG. 3 conceptually shows an example of the display of the document file, and shows an example of the result of the document processing unit 21 displaying the document that has been saved in the client PC 12 by the processing in FIG. 2.

A specific example of the document processing unit 21 is an application that carries out PDF display. The document processing unit 21 can carry out processing for the display, editing, and printing and the like of the generated document. In addition, the document processing unit 21 provides operating functions such as a menu bar 501 and a tool bar 502 to allow the user to carry out various types of operation. The user selects the menu in the menu bar 501 or an icon in the tool bar 502, and is able thereby to carry out display and editing and the like. For example, the displayed document can be printed by the user selecting the print icon 503 in the tool bar 502. In addition, the document processing unit 21 includes a function that handles a preview area 504 for displaying the content of a document. The content of the document 505 is displayed in this preview area 504.

In the document 505, the stamp 507 for unauthorized printing prevention is appended. In the present example, the stamp 507 is a predetermined character string, and in step 405 in FIG. 2, the stamp 507 is added to the document by the document generating server 13. This stamp 507 is printed as-is in the case in which the printing icon 503 has been selected and the printing of the document is executed. Thus, unauthorized document printing can be prevented by printing a character string showing that, similar to the present example, this is an unauthorized printing. In addition, the stamp 507 for unauthorized printing prevention is displayed during a preview. The reason for this is that when the content of a document is previewed on the screen of the client PC 12 by the document generating unit 21, unauthorized printing is prevented by using the captured image of the screen.

Furthermore, in the document 505, a button 506 for authorized printing is appended as an object. This button object is one that the document generating server 13 appends to the document file in step 406 in FIG. 2, and provides a printing operation function for carrying out the printing of the document. This button 506 for authorized printing is a button that allows an authorized printing of the document only once. Although the printing of a document is also possible by using the printing icon 503 of the document processing unit 21, a button 506 for authorized printing is provided to prevent multiple printing. The reason for providing a separate button is that the printing button is to be inactivated after printing in order to prevent unauthorized document printing. The operation during the selecting of the printing icon 503 can be customized to enable carrying out control that makes two or more prints impossible. However, in this method, the addition of functions to the document processing unit 21 is used, and this conventional situation may not be resolved. This means that independent applications are to be installed. Thus, unauthorized document printing is prevented by providing the printing button in the document file itself and deactivating the function of the button after printing. According to this method, the inactivation of the button that executes the printing can be realized without modifying the document processing unit 21.

FIG. 4 is a flowchart that illustrates an example of an operation in which the user has pressed (indicating normal printing) the button 506 for authorized printing and the printing icon 503 for the document 505 that is displayed by the document processing unit 21. The program involved in the flowchart in FIG. 4 is stored in a memory such as the hard disk in the client PC 12 and executed by the CPU. The operation that is shown in FIG. 4 is realized by the document processing unit 21 interpreting the script that has been set in the document in step 407 in FIG. 2. FIG. 5 shows a specific example of the script, and the descriptive content of this will be explained in detail below.

Figures 6A, 6B:
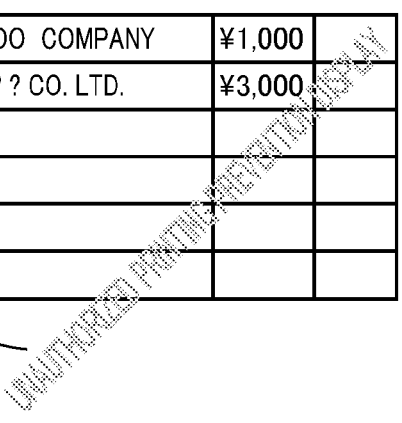
FIG. 6A is a drawing that illustrates a printed image of an authorized printing of the document.
FIG. 6B is a drawing that illustrates a printed image of an unauthorized printing of a document.

First, in step 601, the client PC 12 determines whether the button 506 for authorized printing has been pressed. Specifically, it determines whether a printing operation function that is provided when the user presses the button 506 has been called. When it is determined as a result that the button 506 for authorized printing has been pressed in step 601, the processing moves to step 602. Note that in the case in which the client PC 12 has determined that the button 506 for authorized printing has not been pressed in step 601, the processing proceeds to the determination processing in step 607. In step 607, it is determined whether the print icon 503 has been pressed. In the case in which it has been determined that the print icon 503 has been pressed, the processing proceeds to step 608, and in the case it has been determined that the print icon 503 has not been pressed, the processing proceeds to step 601. In step 608, printing processing is carried out. In the present embodiment, printing data is generated in order to print a document that includes the stamp for unauthorized printing prevention in FIG. 6B, the generated printing data is transmitted to the printing processing apparatus 14, and the document in FIG. 6B is printed by the printing processing apparatus 14.

In step 602, the client PC 12 sets the stamp 507 for the unauthorized printing prevention in the document 505 to hide. In the document 505, in addition to contents such as character strings and the like that carry out the display of "Certificate" and "Jan. 1, 2008", information for the buttons for a dialog with the user and stamps that indicate the state of approval for the document and the like can be maintained separately. Because these buttons and stamps can be treated as individual objects in a document, even after document generation, the document processing unit 21 can control these separately from the contents. Specifically, the document processing unit 21 can freely carry out display, hiding, and deletion and the like by indicating each object name. In step 602, the client PC 12, in which the document processing unit 21 is in operation, indicates the object name of the stamp 507 for unauthorized printing prevention and sets the stamp 507 to hide.

In step 603, the client PC 12 prints the document 505. The stamp 507 for unauthorized printing prevention is set to hide, and thus, the stamp 507 is not printed. In the present embodiment, printing data is generated for printing a document that does not include the stamp for unauthorized printing prevention in FIG. 6A, the generated printing data is transmitted to the print processing apparatus 14, and the document in FIG. 6A is printed by the print processing apparatus 14.

In step 604, the client PC 12 sets the button 506 for authorized printing to delete or hide. Thereby, after authorized printing, the user cannot press the button 506 for authorized printing again. The specific methods for deletion or hiding are identical to the case of the stamp 507 for unauthorized printing prevention.

In step 605, the client PC 12 is set so as to display the stamp 507 for unauthorized printing prevention again. After authorized printing, the stamp 507 for unauthorized printing prevention is displayed again, and thus, unauthorized document printing can be prevented. The specific method for displaying the stamp is the same as the previously described method.

In step 606, the client PC 12 stores the document file. Changes to the display state of the button and stamp are not incorporated unless the document file has been stored. This means that the changed state is finalized by saving the document file.

Figure 14A:
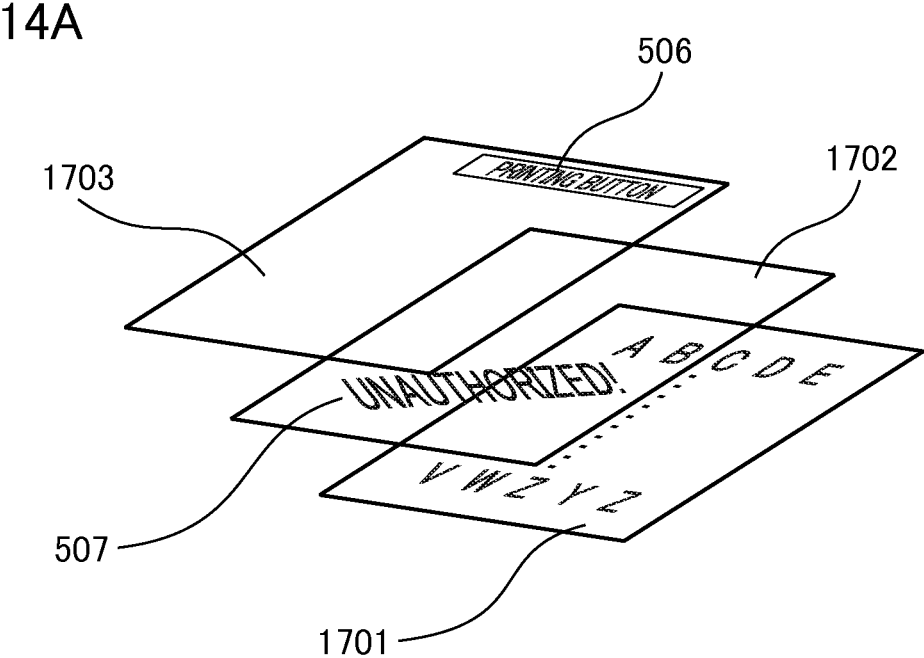
FIG. 14A is a conceptual drawing that shows the structures of generated document files.

FIG. 14A is a conceptual diagram that shows the configuration of a document file in which a script has been embedded. The script is generated by step 407 in FIG. 2, and the order for executing the processing that is shown in FIG. 4 is included.

It is possible to consider the illustrated document to have a structure that is divided into three layers, one for each type of content. The three layers are the character rendering layer 1701, the stamp layer 1702, and the user interface layer 1703. The character rendering layer 1701 is the layer in which the text content in the document is disposed. An example of this is a certificate, and in this case, character information such as a customer's name and an issue date and the like are all disposed in this layer. The stamp layer 1702 is a layer in which an electric acknowledgement stamp in the document and information added to a document such as notes are disposed. The stamp 507 for unauthorized printing prevention is also disposed in this layer. The user interface layer 1703 is a layer for disposing buttons and input boxes and the like, which are methods for interacting with the user, in the document. The button 506 for authorized printing is also disposed in this layer. The acknowledgement stamps, notes, and buttons that are disposed in each of these layers are all treated as objects. Each object can be displayed, hidden, and deleted separately in the respective layers by using the scripts.

FIG. 5 shows an example of the script for executing the processing in FIG. 4. This script includes a command that indicates execution of the processing according to unauthorized printer prevention when the printing operation function that is appended to the document file is called. The script is set in the document file of document 505 in step 407 in FIG. 2. Specifically, this is realized by using Java (registered trademark) Script. The content of the description parts of the script that is shown by reference numerals 701 to 705 will be explained.

In the description part that is shown by reference numeral 701, the stamp 507 for unauthorized printing prevention is hidden. In the description part that is shown by reference numeral 702, printing is executed. In the description part that is shown by reference numeral 703, the button 506 for authorized printing is hidden. In the description part that is shown by the reference numeral 704, the stamp 507 for unauthorized printing prevention is set to display. In the description part that is shown by reference numeral 705, the document file is stored.

FIG. 6A is a conceptual drawing that shows an example of printed matter that has been printed by the processing in step 603 in FIG. 4. In the case in which the user has pressed the button 506 for authorized printing, the printed matter is as shown in FIG. 6A. That is, the stamp 507 for unauthorized printing prevention is not printed, and the user can confirm that this is an authorized printing.

In contrast, FIG. 6B is a conceptual drawing that shows an example of printed matter that has been printed when the user has pressed the printing icon 503 described above. As shown by reference numeral 901, because the document is directly printed with the stamp for unauthorized printing prevention being displayed, the user can confirm that this is unauthorized printed matter.

Figure 7:
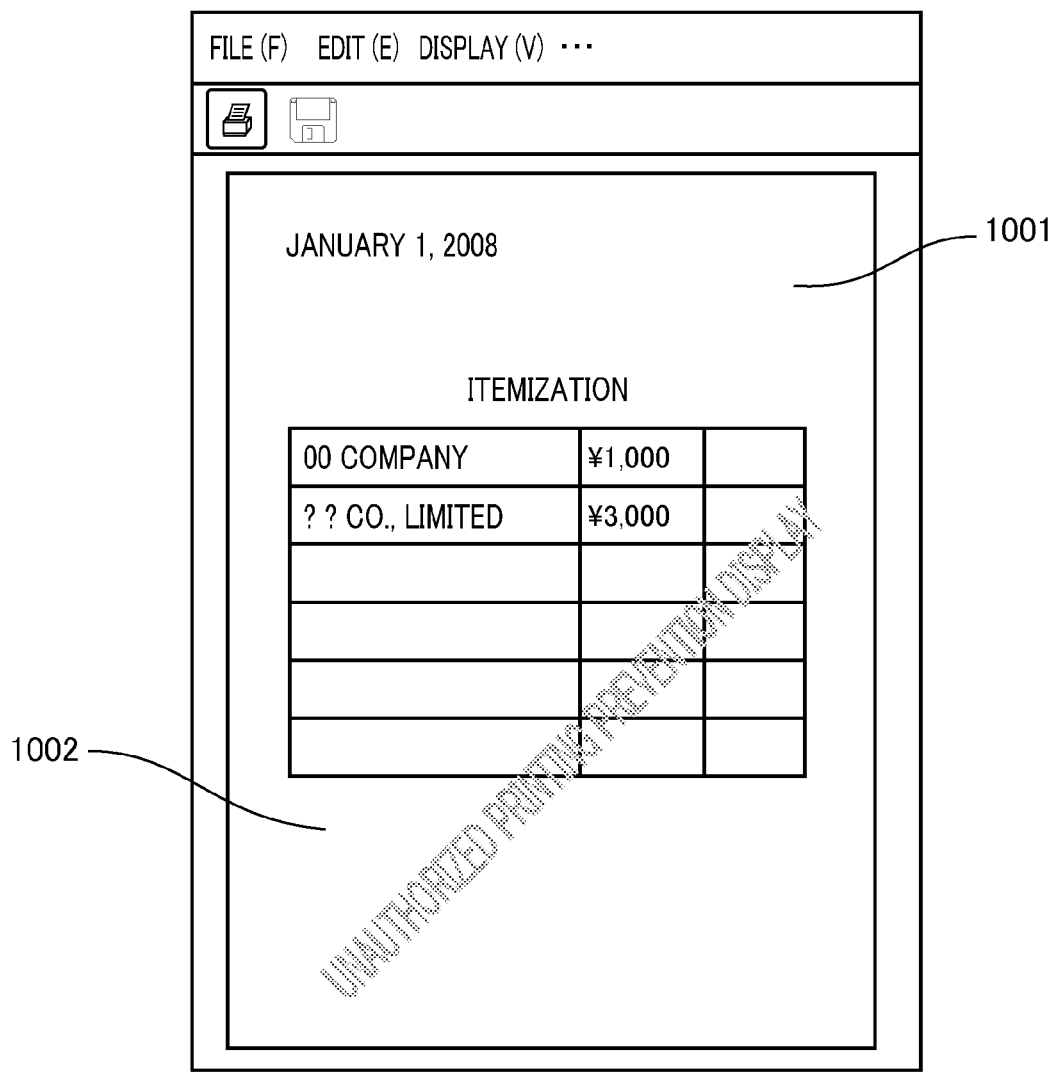
FIG. 7 is a conceptual drawing illustrating the state after an authorized printing processing of a document has been carried out by the document processing unit.

FIG. 7 is a drawing that illustrates a display state by the document processing unit 21 after a user has pressed the button 506 for authorized display in FIG. 4 and authorized printing has been completed. Before the authorized printing, the button 506 for authorized printing is displayed at the location shown by reference numeral 1001, but after the authorized printing has been completed, the button 506 for authorized printing is not displayed at the location shown by reference numeral 1001. Therefore, the user cannot press the button 506 for authorized printing again. In addition, the stamp 507 for unauthorized printing prevention continues to be displayed, as shown by reference numeral 1002. In this manner, only the printing icon 503, which is provided by the document processing unit 21, remains as an operational device for printing. Furthermore, because the stamp 507 for unauthorized printing prevention is printed during printing by the operation of the printing icon 503, unauthorized document printing can be effectively prevented.

Next, a second embodiment of the present invention will be explained.

In the first embodiment described above, an example was explained in which multiple document printing is prevented by controlling the button 506 for authorized printing using a script. However, in the case in which the editing of a script that has been set in a document file, such as a PDF file, is possible, unauthorized document printing thereby becomes possible because the operation of the button 506 for authorized printing can be changed. Thus, in the second embodiment, an example is shown in which a setting for preventing the editing of the document is implemented, and this situation is resolved.

Figure 8:
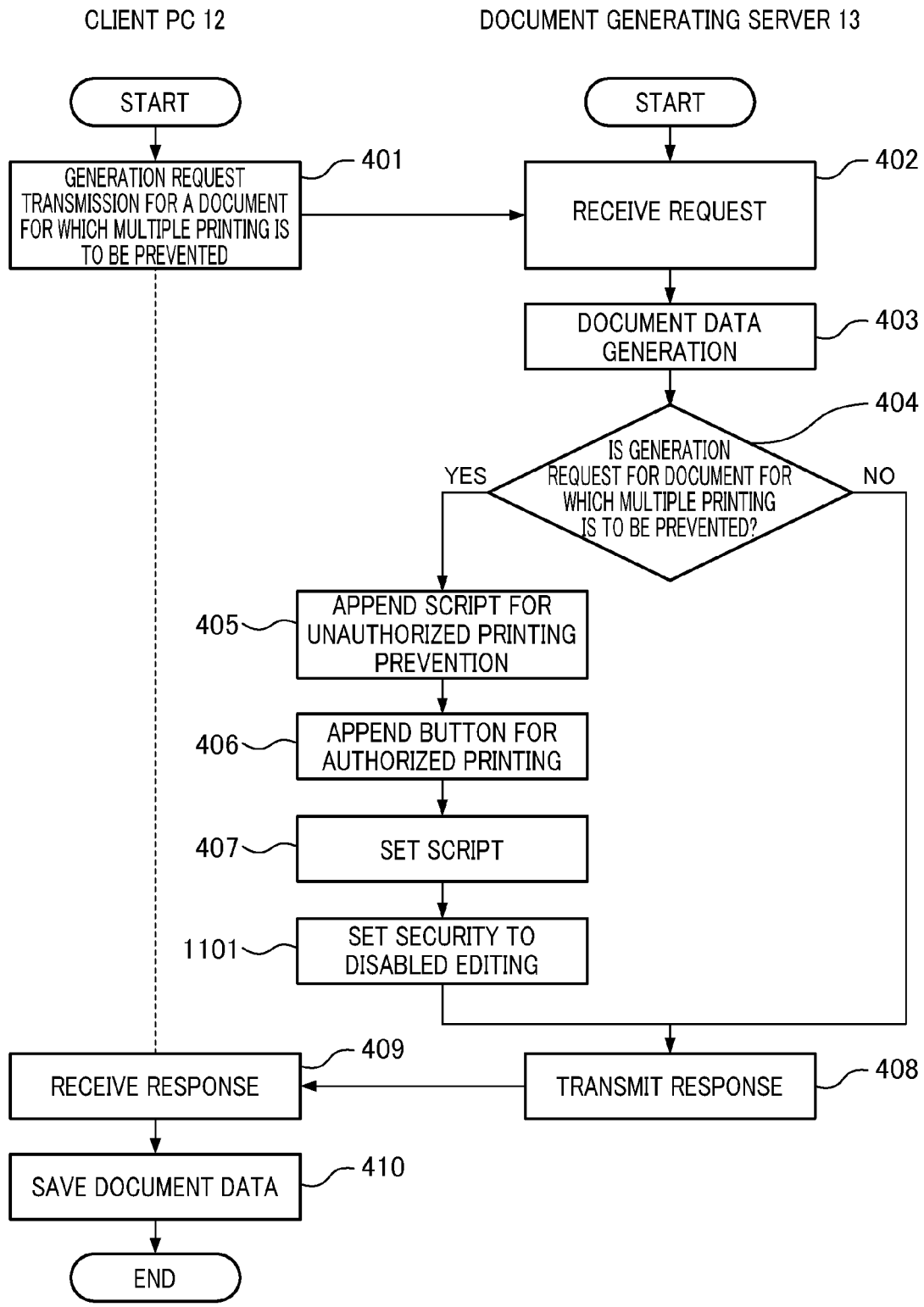
FIG. 8 is a flowchart illustrating the flow of processing according to a second embodiment.
Figure 9:
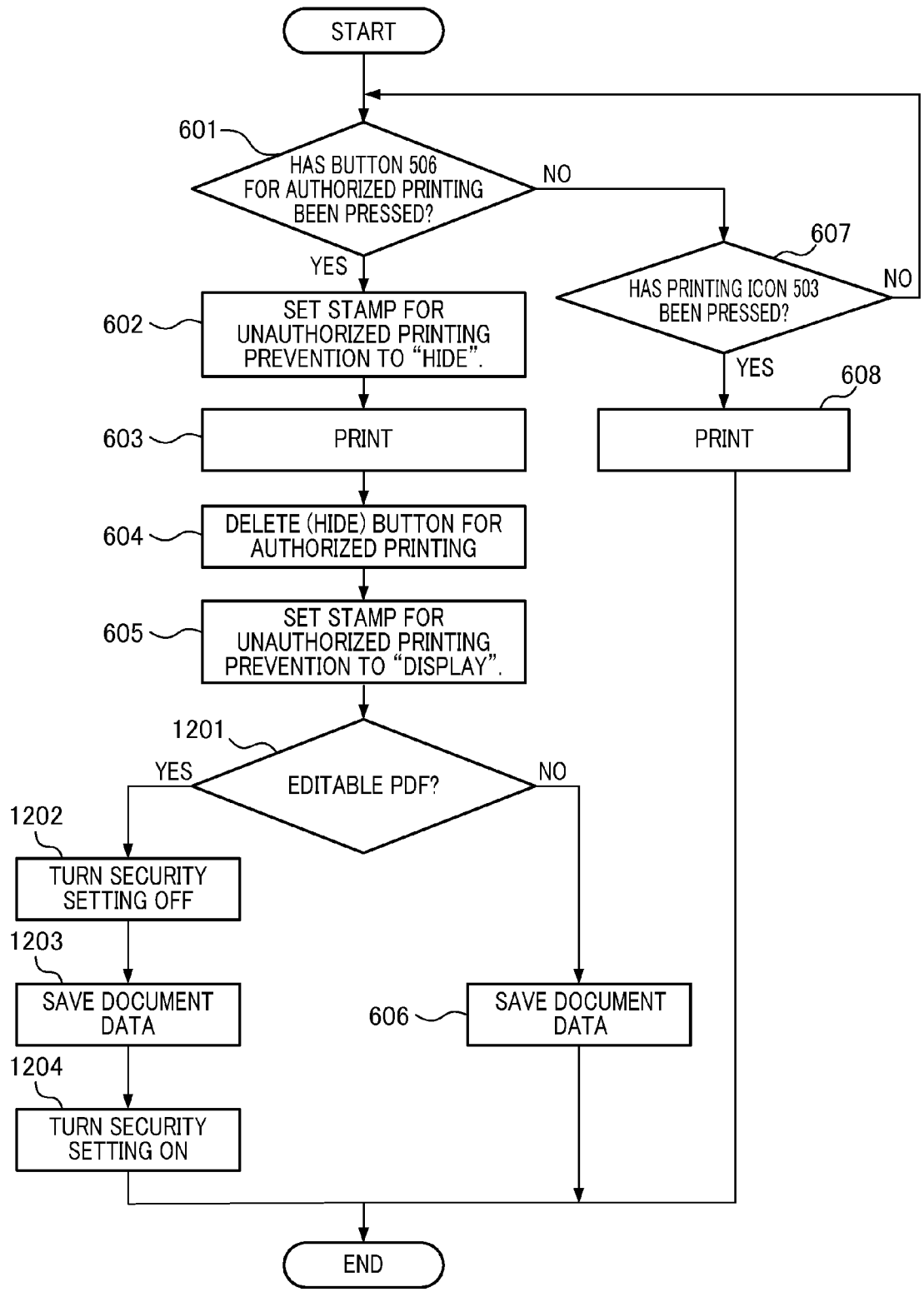
FIG. 9 is a flowchart illustrating the flow of processing at a client PC according to the second embodiment.

FIG. 8 and FIG. 9 are flowcharts that show the flow of processing in the second embodiment. The program involved in the flowchart in FIG. 9 is stored in a memory such as the hard disc of the client PC 12 and is executed by the CPU.

Most of the processing in FIG. 8 and FIG. 9 is identical to the processing that is shown in FIG. 2 and FIG. 4. Thus, in order to avoid redundant explanation, only portions that differ from the first embodiment that is shown in FIG. 2 and FIG. 4 will be explained. Parts that are identical to those in FIG. 2 and FIG. 4 are indicated by identical reference numerals, and explanations thereof are omitted.

In FIG. 8, in the present embodiment, step 1101 is added after step 407 in this embodiment. This step forms a portion of the processing for the case in which it has been determined that a request from the client PC 12 requests the generation of a document for which multiple printing is to be prevented.

In step 1101, the document generating server 13 implements security settings for disabling editing of the document. The document file to which this security setting has been applied is finally saved in the client PC 12 in step 410. Due to the security setting of the document file, the user cannot edit the document by using the document processing unit 21 of the client PC 12. Note that after the setting in step 1101, the processing proceeds to step 408.

Furthermore, in the second embodiment, in FIG. 9, steps 1201 to 1204 are added after step 605. These form a portion of the processing for the case in which it has been determined that the button 506 for authorized printing has been pressed.

In step 1201, the client PC 12 determines whether editing of the document is not permitted or whether editing of the document is not possible. As a result, in the case in which it has been determined that editing of the document is possible, the processing moves to step 606 and the client PC 12 saves the document file. In addition, in the case in which it has been determined that editing of the document is not permitted or not possible, the processing proceeds to step 1202. Here, the client computer PC 12 disables the security restriction, which is set in the document file, that makes editing impossible. Specifically, by temporarily releasing and disabling the restriction and prohibition on editing that has been applied the document file, the document file can be saved.

In step 1203, the client PC 12 saves the document file and the process proceeds to step 1204. Here, the client PC 12 again enables the security restriction that makes editing impossible so that the document file cannot be edited.

In the manner described above, according to the second embodiment, by temporarily disabling the editing restriction, a document file can be saved even for a document that cannot be edited, and unauthorized document printing can be prevented.

Next, a third embodiment of the present invention will be explained.

When the printed matter is copied, after the document has been printed, the preventing effect of the unauthorized printing is weakens. Thus, in the present embodiment, an example is shown in which a document having a copy restricting function (for example, a copy restricting pattern or the like) for preventing the copying of printed matter is generated by the document generating server 13.

Here, a "copy restricting pattern" is a technology in which a hidden character string, such as "copy forbidden", sign, or a design or the like, is embedded in the background of the original and printed to stop unauthorized copying. Here, for example, when printed matter is copied on a copying machine, "copy forbidden" and the like is embossed and visible. In this technology, for example, a hidden character string that remains after the printed matter has been copied is rendered in large dots, and a pattern that disappears after copying is rendered in small dots. The principle used is that when printed matter is copied, the patterns rendered in small dots disappear, and only a hidden character string that contains an expression to the effect that this is an unauthorized copy remains.

Figure 14B:
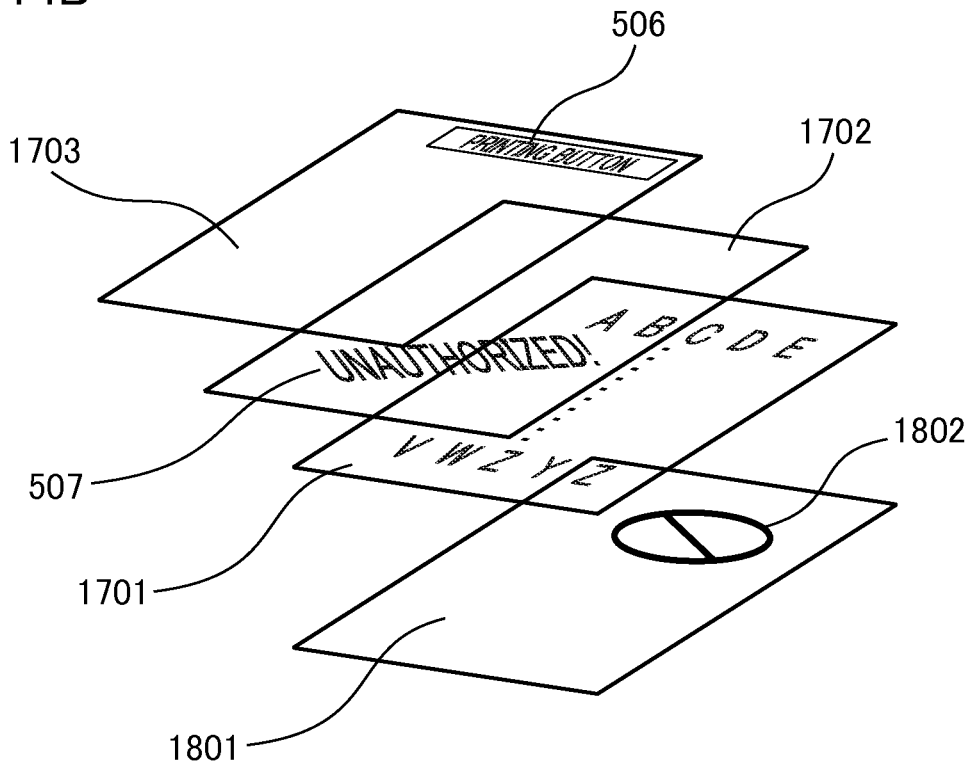
FIG. 14B is a conceptual drawing that shows the structures of generated document files.

FIG. 14B is a conceptual drawing that shows a structure of a document file that is generated in the present embodiment. The portion outside of the image rendering layer 1801, that is, the character rendering layer 1701, the stamp layer 1702, and the user interface layer 1703, are identical to those in FIG. 14A. Thus, the explanation thereof will be omitted.

The image rendering layer 1801 is the layer in which the image data for a copy prohibition mark and image and the like are disposed. The copy prohibition image data 1802, which is formed by the large dots and the small dots that that realize the embossing function, is disposed in this layer.

The copy restricting embossing depends on the type of printing device, and determines whether the realization of this function is possible. For example, an embossing that has been generated for a device A may not function in device B. Thus, in device B, the characters for "copy prohibited" and the like do not appear while copying, and the copying cannot be limited. Therefore, the copy restricting embossing is to be generated in a format unique to the outputting device. However, in contrast, when the document is generated, it is not known which device will be used for printing a document file, such as a PDF file, which is stored in the client PC 12 after being transmitted from the document generating server 13 to the client PC 12. Thus, an embossing having a format that is unique to an output destination device cannot be generated. In consideration of this situation, in the present embodiment, a document file having appended thereto an embossing with a format for a device that is fixed in advance by the document generating server 13 is generated, and at the client PC 12, control is carried out such that only this designated device can print. In addition, because the copy limiting function is applied to a document, during printing, a method that appends a copy limiting function is implemented in a device or a printer device.

Figure 10:
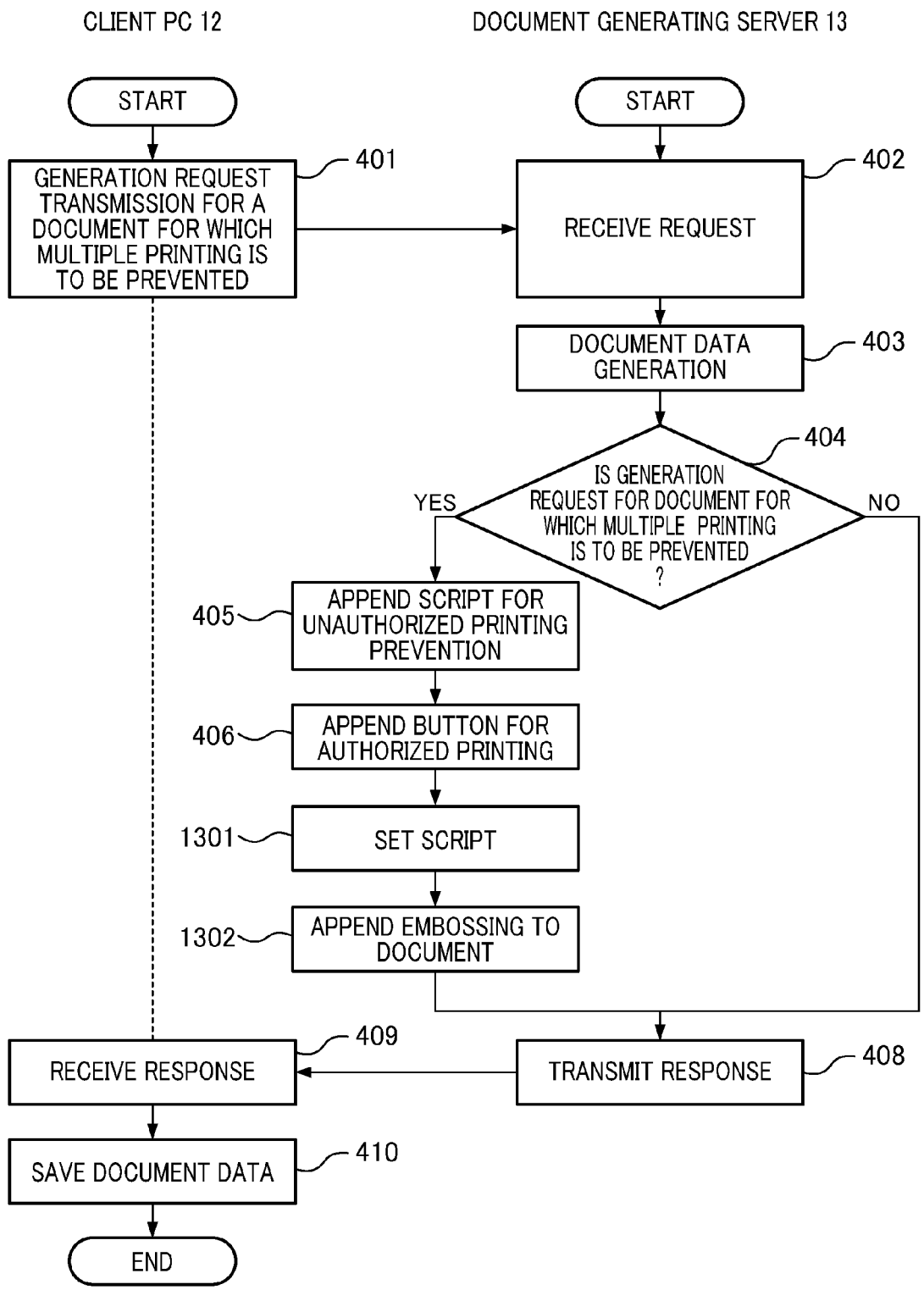
FIG. 10 is a flowchart illustrating the flow of processing according to a third embodiment.
Figure 11:
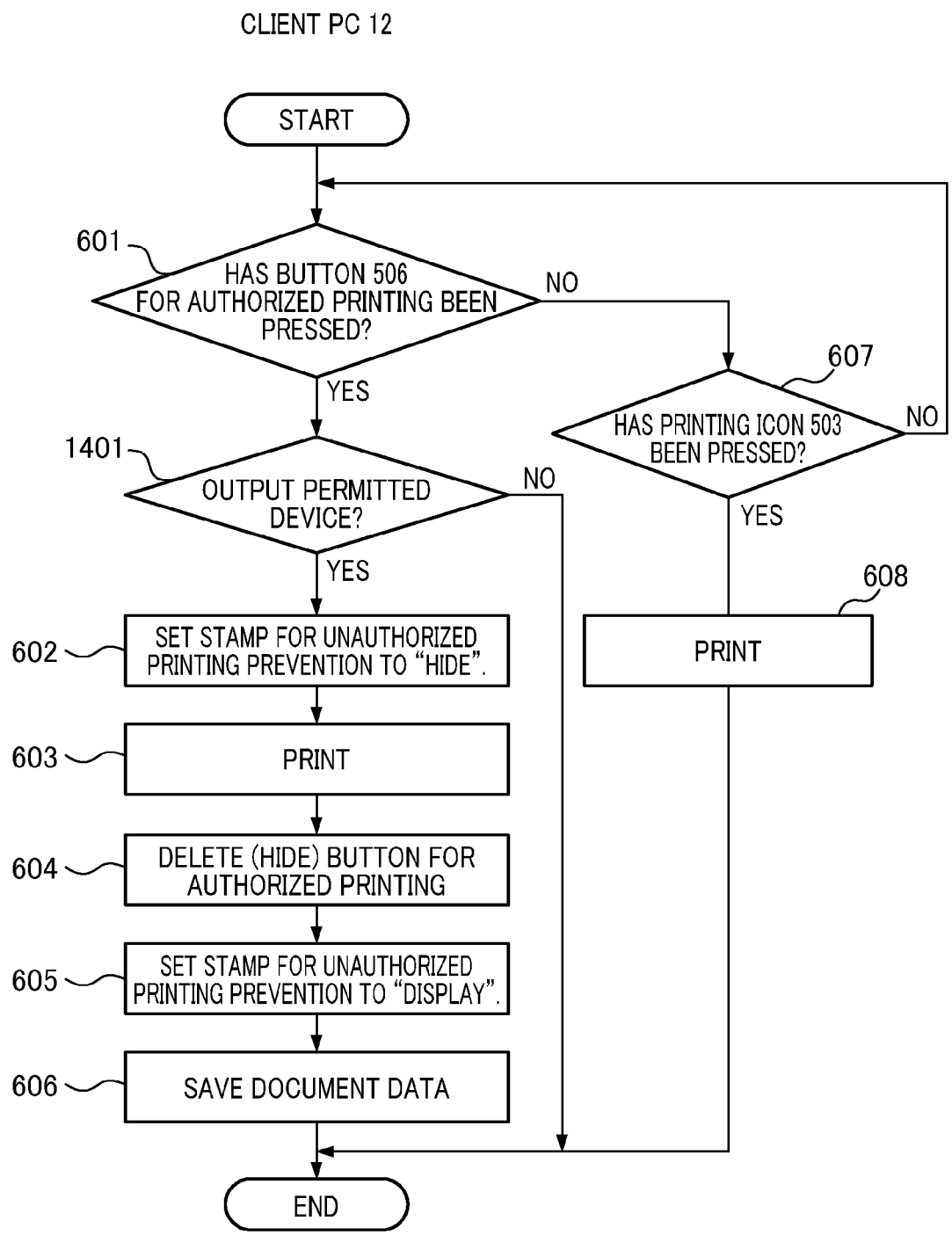
FIG. 11 is a flowchart illustrating the flow of processing at a client PC according to the third embodiment.

FIG. 10 and FIG. 11 are flowcharts that illustrate the flow of processing in the third embodiment. A program that is involved in the flowchart in FIG. 11 is stored in a memory such as a hard disc of the client PC 12, and is executed by a CPU.

Most of the processing in FIG. 10 and FIG. 11 is identical to the processing that is shown in FIG. 2 and FIG. 4. Thus, in order to avoid redundant explanation, only portions that differ from the first embodiment that is shown in FIG. 2 and FIG. 4 will be explained. Parts that are identical to those in FIG. 2 and FIG. 4 are indicated by identical reference numerals, and explanations thereof are omitted.

In FIG. 10, steps 1301 and 1302 have been added. Steps 1301 and 1302 are processes for the case in which it has been determined that a request from the client PC 12 is requesting the generation of a document for which multiple printing is to be prevented. Note that in step 1301, processing content is added.

In step 1301, which is a continuation of step 406, the document generating server 13 sets a script for carrying out control such that a document can only be printed by a device (below, referred to as a "printing permitted device") that is permitted to print. At the client PC 12, printing cannot be carried out by a device other than a printing permitted device, which is permitted to print by this script. Information that specifies which device type is a printing permitted device is uniquely held in a settings file and the like in the system.

In step 1302, the document generating server 13 appends a copy limiting function such as embossing to the document. At this time, the embossing is generated in a format that is compatible with the printing permitted device. Then, the processing proceeds to step 408.

In the third embodiment, after step 601 in FIG. 11, a further step 1401 is added. Specifically, this step follows the processing for the case in which it has been determined that the button 506 for authorized printing has been pushed.

In step 1401, the client PC 12 determines whether the device that is the output destination for printing is a device that is permitted to output (below, referred to as a "output permitted device"). The processing that obtains the type of the output destination device is also executed by a script that has been embedded in the document file.

In step 1401, in the case in which it has been determined that the device designated as the output destination is not an output permitted device, printing is cancelled and the sequence of processes ends.

In addition, in step 1401, in the case in which it has been determined that the device designated as the output destination is an output permitted device, the processing proceeds to step 602, and processing (steps 602 through 606), which is identical to the case of the first embodiment, is carried out. Thereby, when a document is printed by the client PC 12, a copy limiting image such as an embossing is printed on the document. Therefore, a display of characters, signs, and patterns and the like that are printed show that the document was an unauthorized copy when copied, and unauthorized printing can thereby be prevented. In addition, because the document can only be printed by a printing permitted device assigned in advance, the embossing does not function, and abuse due to being able to make unauthorized copies can be prevented.

Next, a fourth embodiment of the present invention will be explained.

There are cases in which the saving of a document file is impossible due to the type or version of the document processing unit 21 of the client PC 12. In this case, because the document file cannot be saved after an authorized printing of the document, the user can operate the button 506 for authorized printing any number of times. Thus, printing a document many times cannot be prevented. Therefore, in the present embodiment, a function is added that checks in advance whether a document file can be saved. In addition, an example is shown in which the situation described above is resolved by directly printing a document file showing the stamp 507 for unauthorized printing prevention in the case in which the saving of a document file is impossible.

Figure 12:
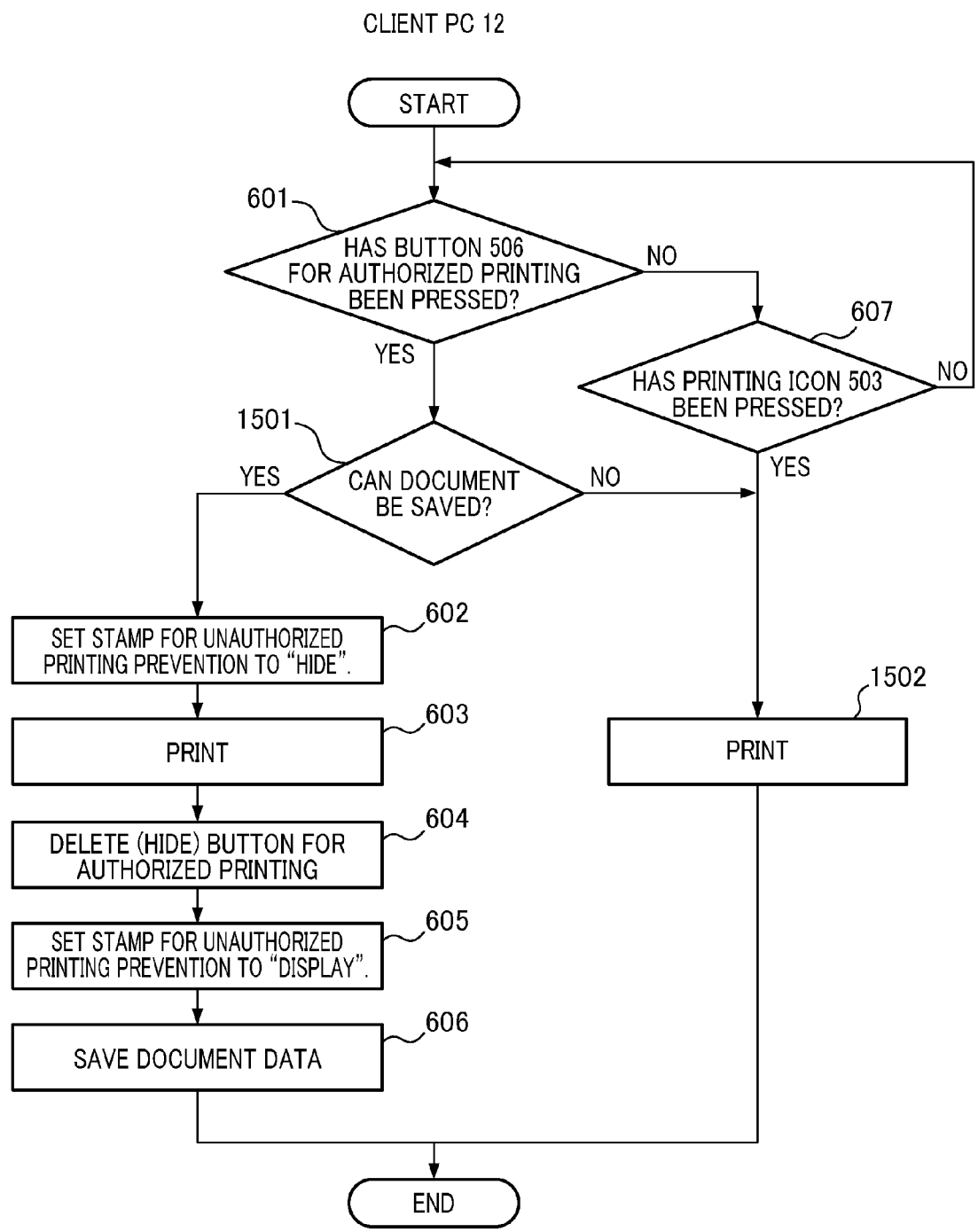
FIG. 12 is a flowchart illustrating the flow of processing at a client PC according to a fourth embodiment.

FIG. 12 is a flowchart that illustrates an example of the flow of the processing in the fourth embodiment. Note that most of the processing in FIG. 12 is identical to the processing that is shown in FIG. 4. Thus, in order to avoid redundant explanations, only the portions that differ from the first embodiment shown in FIG. 4 are explained. Parts corresponding to those in FIG. 4 are indicated by identical reference numerals, and the explanations thereof are omitted.

First, in step 601, the client PC 12 determines the operational state of the button 506 for authorized printing, and as a result, in the case in which the client PC 12 has determined that the button 506 for authorized printing has been pressed, the processing proceeds to step 1501. Here, the client PC 12 determines whether the document file can be saved. As a result, in the case in which it has been determined that the document file can be saved, the processing in steps 602 to 606, which is identical to that of the first embodiment, is carried out.

In contrast, in the case in which it has been determined in step 1501 that the document file cannot be saved, the processing proceeds to step 1502. Here, the client PC 12 carries out printing processing for the document. Because a document is directly printed showing a stamp 507 for unauthorized printing, the printed document cannot be used as official printed matter. In this manner, in an environment in which the display of the button 506 for authorized printing cannot be controlled, measures can be taken so that authorized document printing is not carried out. Thereby, it is possible to prevent official printed matter from being printed any number of times.

According to the embodiment explained above, multiple document printing can be prevented by a mechanism that is simpler than the conventional mechanism. Specifically, in order to prevent multiple printing, because introducing databases or dedicated applications and the like to the client is not necessary, the protection and management of applications is simplified, and the operating costs can be reduced. In addition, in the case in which a document that has been generated in a server is printed by the client, in an environment in which an application for PDF display, which is distributed free of charge, is introduced, multiple printing prevention can be prevented anywhere.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-029108 filed Feb. 10, 2009 which is hereby incorporated by reference herein in its entirety.

What is claimed is:

1. An apparatus comprising:
    a first control unit configured to display, before pressing a button for authorized printing in a document, an unauthorized printing prevention image and the button for authorized printing in the document; and
    a second control unit configured to set, when the button for authorized printing is pressed and the document can be saved, the unauthorized printing prevention image to invisible, and configured to print the document without the unauthorized printing prevention image, and configured to display the unauthorized printing prevention image without displaying the button for authorized printing, and configured to store the document,
    wherein the second control unit is configured to print, when the button for authorized printing is pressed and the document cannot be saved, the document with the unauthorized printing prevention image.

2. The apparatus according to claim 1, wherein the second control unit is further configured to print, when normal printing is designated, the document with the unauthorized printing prevention image.

3. The apparatus according to claim 1, wherein a script is set in the document, and
    wherein the second control unit performs based on the script.

4. A method for controlling an apparatus, comprising:
    displaying, before pressing a button for authorized printing in a document, an unauthorized printing prevention image and the button for authorized printing in the document in a first controlling step; and
    setting, when the button for authorized printing is pressed and the document can be saved, the unauthorized printing prevention image to invisible, printing the document without the unauthorized printing prevention image, displaying the unauthorized printing prevention image without displaying the button for authorized printing, and storing the document in a second controlling step,
    wherein, in the second controlling step, when the button for authorized printing is pressed and the document cannot be saved, the document is printed with the unauthorized printing prevention image.

5. The method according to claim 4, wherein, in the second controlling step, when normal printing is designated, the document is printed with the unauthorized printing prevention image.

6. The method according to claim 4, wherein a script is set in the document, and
    wherein the second controlling step is performed based on the script.

7. A non-transitory storage medium on which is stored a computer program for making a computer execute a method for controlling an apparatus, the method comprising:
    displaying, before pressing a button for authorized printing in a document, an unauthorized printing prevention image and the button for authorized printing in the document in a first controlling step; and
    setting, when the button for authorized printing is pressed and the document can be saved, the unauthorized printing prevention image to invisible, printing the document without the unauthorized printing prevention image, displaying the unauthorized printing prevention image without displaying the button for authorized printing, and storing the document in a second controlling step, wherein, in the second controlling step, when the button for authorized printing is pressed and the document cannot be saved, the document is printed with the unauthorized printing prevention image.

8. The non-transitory storage medium according to claim 7, wherein, in the second controlling step, when normal printing is designated, the document is printed with the unauthorized printing prevention image.

9. The non-transitory storage medium according to claim 7, wherein a script is set in the document, and wherein the second controlling step is performed based on the script.

* * * * *